(12) United States Patent
Okano et al.

(10) Patent No.: US 10,790,516 B2
(45) Date of Patent: Sep. 29, 2020

(54) GAS DIFFUSION ELECTRODE AND METHOD FOR MANUFACTURING SAME

(71) Applicant: Toray Industries, Inc., Tokyo (JP)

(72) Inventors: Yasutaka Okano, Otsu (JP); Junichi Urai, Otsu (JP); Yasuaki Tanimura, Otsu (JP); Masamichi Utsunomiya, Otsu (JP)

(73) Assignee: Toray Industries, Inc., Tokyo (JP)

( * ) Notice: Subject to any disclaimer, the term of this patent is extended or adjusted under 35 U.S.C. 154(b) by 194 days.

(21) Appl. No.: 16/064,237

(22) PCT Filed: Dec. 16, 2016

(86) PCT No.: PCT/JP2016/087625
§ 371 (c)(1),
(2) Date: Jun. 20, 2018

(87) PCT Pub. No.: WO2017/110691
PCT Pub. Date: Jun. 29, 2017

(65) Prior Publication Data
US 2019/0006682 A1    Jan. 3, 2019

(30) Foreign Application Priority Data

Dec. 24, 2015 (JP) .................. 2015-251257

(51) Int. Cl.
*H01M 4/96* (2006.01)
*H01M 4/86* (2006.01)
(Continued)

(52) U.S. Cl.
CPC .............. *H01M 4/96* (2013.01); *H01M 4/86* (2013.01); *H01M 4/8605* (2013.01); *H01M 4/88* (2013.01);
(Continued)

(58) Field of Classification Search
None
See application file for complete search history.

(56) References Cited

U.S. PATENT DOCUMENTS 6,127,059 A    10/2000  Kato
7,150,934 B2   12/2006  Yoshida et al.
(Continued)

FOREIGN PATENT DOCUMENTS

CN    102341943 A    2/2012
JP    2000123842 A   4/2000
(Continued)

OTHER PUBLICATIONS

International Search Report and Written Opinion for International Application No. PCT/JP2016/087625, dated Mar. 14, 2017—6 pages.
(Continued)

*Primary Examiner* — Wojciech Haske
(74) *Attorney, Agent, or Firm* — RatnerPrestia (57) ABSTRACT

A gas diffusion electrode includes a porous carbon electrode substrate and a microporous layer(s) provided at least on one surface of the porous carbon electrode substrate. The porous carbon electrode substrate is composed of carbon short fibers bonded with a resin carbide. When the region of the porous carbon electrode substrate, extending from a plane that has a 50% filling rate and is closest to one surface of the substrate to a plane that has the 50% filling rate and is closest to the other surface thereof, is trisected in the through-plane direction to obtain three layers, a layer located closer to one surface has a layer filling rate different from the layer filling rate of the layer located closer to the other surface. The microporous layer has a thickness under an added pressure of 0.15 MPa of from 28 to 45 μm, and has a thickness under an added pressure of 2 MPa of from 25 to 35 μm.

5 Claims, 1 Drawing Sheet

(51) Int. Cl.
  *H01M 4/88* (2006.01)
  *H01M 8/10* (2016.01)

(52) U.S. Cl.
  CPC ....... *H01M 4/8807* (2013.01); *H01M 4/8875* (2013.01); *H01M 8/10* (2013.01); *Y02P 70/56* (2015.11)

(56) References Cited

U.S. PATENT DOCUMENTS

| | | | |
|---|---|---|---|
| 7,749,639 | B2 | 7/2010 | Ichikawa et al. |
| 8,641,939 | B2 | 2/2014 | Chida et al. |
| 9,570,758 | B2 | 2/2017 | Gomi et al. |
| 2006/0046926 | A1 | 3/2006 | Ji et al. |
| 2007/0224479 | A1 | 9/2007 | Tadokoro et al. |
| 2011/0171563 | A1 | 7/2011 | Waki et al. |
| 2011/0318661 | A1 | 12/2011 | Uensal et al. |
| 2014/0011118 | A1 | 1/2014 | Lee et al. |
| 2014/0134516 | A1 | 5/2014 | Okuyama et al. |
| 2015/0372332 | A1* | 12/2015 | Okano ................ H01M 4/8807 429/534 |
| 2017/0237079 | A1 | 8/2017 | Tanimura et al. |

FOREIGN PATENT DOCUMENTS

| | | | |
|---|---|---|---|
| JP | 2000182626 A | 6/2000 | |
| JP | 2001160399 A | 6/2001 | |
| JP | 2002352807 A | 12/2002 | |
| JP | 3382213 B2 | 3/2003 | |
| JP | 2004281363 A | 10/2004 | |
| JP | 2006004879 A | 1/2006 | |
| JP | 2006155921 A | 6/2006 | |
| JP | 2007214019 A | 8/2007 | |
| JP | 3773325 B2 | 2/2008 | |
| JP | 2008300195 A | 12/2008 | |
| JP | 2009016171 A | 1/2009 | |
| JP | 2009238376 A | 10/2009 | |
| JP | 2010070433 A | 4/2010 | |
| JP | 2010267539 A | 11/2010 | |
| JP | 4780814 B2 | 9/2011 | |
| JP | 2011233274 A | 11/2011 | |
| JP | 2011243314 A | 12/2011 | |
| JP | 2012033458 A | 2/2012 | |
| JP | 2012054111 A | 3/2012 | |
| JP | 2012204142 A | 10/2012 | |
| JP | 2013065413 A | 4/2013 | |
| JP | 2014011163 A | 1/2014 | |
| JP | 2014232691 A | 12/2014 | |
| JP | 2015195111 A | 11/2015 | |
| WO | 03081700 A1 | 10/2003 | |
| WO | 2007037084 A1 | 4/2007 | |
| WO | 2010035815 A1 | 4/2010 | |
| WO | 2012172994 A1 | 12/2012 | |
| WO | WO-2014126002 A1 * | 8/2014 | .......... H01M 8/0241 |
| WO | 2016060043 A1 | 4/2016 | |

OTHER PUBLICATIONS

International Search Report and Written Opinion for International Application No. PCT/JP2016/087626, dated Mar. 7, 2017, 9 pages.
International Search Report and Written Opinion for International Application No. PCT/JP2016/087624, dated Feb. 14, 2017, 6 pages.
Non Final Office Action for U.S. Appl. No. 15/777,447, dated Jan. 27, 2020, 16 pages.
Non Final Office Action for U.S. Appl. No. 16/064,234, dated Mar. 27, 2020, 10 pages.

* cited by examiner

GAS DIFFUSION ELECTRODE AND METHOD FOR MANUFACTURING SAME

CROSS REFERENCE TO RELATED APPLICATIONS

This is the U.S. National Phase application of PCT/JP2016/087625, filed Dec. 16, 2016, which claims priority to Japanese Patent Application No. 2015-251257, filed Dec. 24, 2015, the disclosures of these applications being incorporated herein by reference in their entireties for all purposes.

TECHNICAL FIELD OF THE INVENTION

Fuel cells utilize a mechanism to electrically extract the energy generated when hydrogen is allowed to react with oxygen to produce water, and are expected to gain popularity as clean energy because of their high energy efficiency and the fact that they discharge only water as their effluent. The present invention relates to a gas diffusion electrode for use in a fuel cell. More particularly, the present invention relates to a gas diffusion electrode for use in a polymer electrolyte fuel cell, among fuel cells, which cell is used as a power supply for a fuel cell vehicle or the like.

BACKGROUND OF THE INVENTION

In a fuel cell, such as a polymer electrolyte fuel cell, for example, reaction gases (a fuel gas and an oxidizing gas) are each supplied through a gas diffusion layer, to a membrane electrode assembly composed of a polymer electrolyte membrane sandwiched between a pair of catalyst layers, so as to induce an electrochemical reaction, and to convert chemical energy of substances directly into electrical energy.

A gas diffusion layer in a fuel cell includes: a porous carbon electrode substrate, such as a carbon paper which has been subjected to a hydrophobic treatment; and a microporous layer provided on the surface of the porous carbon electrode substrate which is in contact with a catalyst layer. When naps of carbon fibers in the porous carbon electrode substrate penetrate into the polymer electrolyte membrane, there are risks that the performance of the fuel cell may be reduced, due to the occurrence of a short circuit current and the deterioration of the polymer electrolyte membrane starting from the points through which the naps have penetrated. In particular, although the impact on the initial power generation may be small, the repeated swelling and shrinking of the membrane due to the repeated starting and stopping of the fuel cell increases the occurrence of a short circuit current and accelerates the deterioration of the polymer electrolyte membrane, thereby resulting in a reduced durability of the fuel cell.

PATENT DOCUMENTS

Patent Document 1 discloses a method of producing a porous carbon electrode substrate in which a treatment of spraying a gas on at least one surface of the porous carbon electrode substrate is carried out to sufficiently remove carbon short fibers debonded from a resin carbide binding the short fibers.

Further, Patent Document 2 discloses a method in which: a gas diffusion layer including a layer composed of carbon fibers and a hydrophobic layer laminated thereon is prepared; an insulating member having a plurality of communication pores is disposed on the hydrophobic layer side of the gas diffusion layer; the gas diffusion layer and the insulating member are sandwiched between a pair of electrodes; the resultant is further sandwiched by a pair of surface pressure plates by disposing each surface pressure plate on the back surface of each electrode; and the gas diffusion layer is pressurized by the pair of surface pressure plates. In this method, when a voltage is applied to the pair of electrodes while maintaining the pressurized state, a current flows through the communication pores of the insulating member, to the protruded portions of the carbon fibers which are in contact with the electrode on the hydrophobic layer side, and the protruded portions of the carbon fibers are eliminated by being burned by Joule heat.

On the other hand, Patent Document 3, discloses a method in which a sheet having elasticity is disposed on at least one surface of a porous carbon electrode substrate composed of carbon short fibers bonded by carbon, and after pressuring the porous carbon electrode substrate and the sheet at a linear pressure of from 5 kN/m to 30 kN/m using a continuous pressurizing means, the powder of carbon attached to the porous carbon electrode substrate is continuously removed by a method such as brushing off the powder using a brush or the like, suctioning, or ultrasonic cleaning.

PATENT DOCUMENTS

Patent Document 1: JP 2010-70433 A
Patent Document 2: JP 2012-33458 A
Patent Document 3: JP 2012-204142 A

SUMMARY OF THE INVENTION

However, although the method disclosed in Patent Document 1 allows for cleaning the surface of the gas diffusion layer to a certain extent, there is a problem that the protrusions of carbon fibers are newly generated when the gas diffusion layer is compressed, for example, during the process of bonding the electrode substrate with the polymer electrolyte membrane, and these protrusions may penetrate into the polymer electrolyte membrane, leading the occurrence of a large short circuit current.

In the method disclosed in Patent Document 2, the carbon fibers are more likely to be burned or cut at the narrow portions of the protruded carbon fibers where high heat is generated, or at the portions of the protruded carbon fibers close to the central area thereof in the longitudinal direction, where heat dissipation is low. Therefore, the portions of the protruded carbon fibers between the gas diffusion layer and the cut sites may remain, or the portions of the protruded carbon fibers ahead of the cut sites may be mixed into the polymer electrolyte membrane, resulting in a problem of the occurrence of a short circuit current in the membrane.

Further, the method disclosed in Patent Document 3 also has a problem that, by disposing the sheet having elasticity on at least one surface of the porous carbon electrode substrate, the effect of removing the carbon short fibers by pressurization is reduced.

Accordingly, an object of the present invention is to overcome the problems as described above, and to provide a gas diffusion electrode which is less susceptible to the occurrence of a short circuit current when used in a fuel cell, in which insufficiently bonded carbon short fibers are sufficiently removed from the surface of a porous carbon electrode substrate, and which includes a microporous layer(s) having a sufficient thickness under compression.

In order to solve the above mentioned problems, the gas diffusion electrode according to the present invention has the following constitutions. That is, the present invention provides:

a gas diffusion electrode having a microporous layer on at least one surface of a porous carbon electrode substrate, wherein the porous carbon electrode substrate is composed of carbon short fibers bonded with a resin carbide;

wherein the porous carbon electrode substrate has a bulk density of from 0.20 to 0.40 g/cm$^3$;

wherein the porous carbon electrode substrate has an areal weight ratio of from 0.3 to 0.65;

wherein, when the region of the porous carbon electrode substrate, extending from a plane that has a 50% filling rate defined below and is closest to one surface of the substrate to a plane that has the 50% filling rate and is closest to the other surface thereof, is trisected in the through-plane direction to obtain three layers, a layer located closer to one surface has a layer filling rate defined below different from the layer filling rate of the layer located closer to the other surface; and wherein the microporous layer has a thickness under an added pressure of 0.15 MPa of from 28 to 45 μm, and has a thickness under an added pressure of 2 MPa of from 25 to 35 μm.

The areal weight ratio as used herein is defined as a value obtained by the equation: areal weight ratio=(A−B)/B: wherein A represents the areal weight (g/m$^2$) of the porous carbon electrode substrate, and B represents the areal weight (g/m$^2$) of the carbon short fibers in the porous carbon electrode substrate.

The 50% filling rate as used herein is defined as a value obtained by measuring the filling rate of a plane at every certain length in the direction from one surface toward the other surface of the porous carbon electrode substrate, then calculating the mean value of the measured filling rates of planes, and further obtaining a value corresponding to 50% of the calculated mean value as the 50% filling rate.

Further, the layer filling rate of a layer, as used herein, is defined as the mean value obtained from the filling rates of planes constituting the layer.

According to the present invention, it is possible to obtain a gas diffusion electrode: which is less susceptible to the occurrence of a short circuit current when used in a fuel cell; which includes a porous carbon electrode substrate in which insufficiently bonded carbon short fibers and a resin carbide are sufficiently removed from the substrate surface; and which further includes a microporous layer(s) having a sufficient thickness under compression.

DETAILED DESCRIPTION OF EMBODIMENTS OF THE INVENTION

The gas diffusion electrode according to an embodiment of the present invention is:

a gas diffusion electrode having a microporous layer on at least one surface of a porous carbon electrode substrate, wherein the porous carbon electrode substrate is composed of carbon short fibers bonded with a resin carbide;

wherein the porous carbon electrode substrate has a bulk density of from 0.20 to 0.40 g/cm$^3$;

wherein the porous carbon electrode substrate has an areal weight ratio of from 0.3 to 0.65;

wherein, when the region of the porous carbon electrode substrate, extending from a plane that has a 50% filling rate and is closest to one surface of the substrate to a plane that has the 50% filling rate and is closest to the other surface thereof, is trisected in the through-plane direction to obtain three layers, a layer located closer to one surface has a layer filling rate different from the layer filling rate of the layer located closer to the other surface; and wherein the microporous layer has a thickness under an added pressure of 0.15 MPa of from 28 to 45 μm, and has a thickness under an added pressure of 2 MPa of from 25 to 35 μm.

As the carbon fibers constituting the carbon short fibers, polyacrylonitrile (PAN)-based carbon fibers, pitch-based carbon fibers, and rayon-based carbon fibers can be used. Among these, the PAN-based and pitch-based carbon fibers, particularly, the PAN-based carbon fibers are preferably used, because they are excellent in mechanical strength, and allow for producing electrode substrates having an adequate flexibility.

It is preferable to select, as such carbon fibers, those having a mean diameter (mean diameter of monofilaments) of from 4 to 20 μm. When the carbon fibers having a mean diameter of from 4 to 20 μm are used, the flexibility and the mechanical properties of the resulting porous carbon electrode substrate can be improved. Further, since the carbon short fibers are obtained from such carbon fibers, it is preferred that the carbon short fibers also have a mean diameter of from 4 to 20 μm.

To obtain the mean diameter of the monofilaments of carbon fibers, a cross sectional image of the monofilaments of the carbon fibers is captured, to measure the diameters of the monofilaments from the captured image. In cases where a monofilament does not have a circular cross section, the mean value of the longer diameter and the shorter diameter is taken as the diameter of the monofilament. The mean value of the measured diameters of five pieces of monofilaments is taken as the mean diameter. The same applies to the case in which the carbon fibers are carbon short fibers.

The carbon short fibers in the present invention refer to carbon fibers having a mean fiber length of from 3 to 20 mm. In other words, the carbon short fibers can be obtained by cutting the above described carbon fibers. However, it is important, at this time, that the carbon fibers be cut such that the resulting short fibers have a mean fiber length within the range of from 3 to 20 mm. When carbon fibers having a mean fiber length of less than 3 mm are used, the mechanical properties, such as the maximum bending load, the bending modulus and so on, of the resulting porous carbon electrode substrate may be reduced. When carbon fibers having a mean fiber length of greater than 20 mm are used, on the other hand, the dispersibility of the carbon fibers during the papermaking to be described later is deteriorated, and the variation in the areal weight of the carbon fibers in the resulting porous carbon electrode substrate may be increased, possibly resulting in poor quality.

A carbon short fiber sheet in which the carbon short fibers are dispersed can be obtained by any of a dry papermaking method and a wet papermaking method. However, the wet papermaking method in which water is used as a papermaking medium is preferred, because the carbon short fibers are more likely to be oriented to face the surface of the sheet. In other words, when the wet papermaking method is used, the carbon short fibers are less likely to be oriented in the direction penetrating the sheet, and thus, a short circuit current penetrating the membrane of a fuel cell is less likely to occur, and the short circuit current can be reduced to a low level. At the same time, a uniform sheet in which the carbon short fibers are well dispersed can be obtained, and the short circuit current can be reduced to a low level at a number of measurement points. Therefore, the use of the wet papermaking method is preferred. To control the pore structure of the porous carbon electrode substrate, flame-resistant threads, organic fibers and pulp in a mass equal to or less than the mass of the carbon short fibers may be incorporated into the carbon short fiber sheet, by carrying out mixed papermaking. To prevent the falling of the carbon short fibers from the porous carbon electrode substrate, the total content of the flame-resistant threads, organic fibers and pulp is preferably 0 parts by mass or more and 50 parts by mass or less, with respect to 100 parts by mass of the carbon short fibers in the porous carbon electrode substrate. Further, the carbon short fiber sheet preferably contains organic binders such as polyvinyl alcohol, cellulose, a polyester, an epoxy resin, a phenol resin, and/or an acrylic resin, in order to improve the morphological retention, handling properties and the like of the sheet. In such a case, the total content of the organic binders in 100% by mass of the carbon short fiber sheets is preferably from 1 to 30% by mass.

In the production of the carbon short fiber sheet, it is preferred that the areal weight of the carbon short fibers in the carbon short fiber sheet be adjusted within the range of from 10 to 50 $g/m^2$. When the areal weight of the carbon short fibers in the carbon short fiber sheet is adjusted within the range of from 10 to 50 $g/m^2$, the resulting porous carbon electrode substrate has an excellent mechanical strength, and at the same time, can maintain a sufficient flexibility. In addition, when the areal weight of the carbon short fibers in the carbon short fiber sheet is adjusted within the range of from 10 to 50 $g/m^2$, it is possible to prevent the carbon short fibers from being oriented in the direction penetrating the sheet, and thus, to reduce the occurrence of a short circuit penetrating the membrane of the resulting fuel cell. As a result, the short circuit current can be reduced to a low level, and at the same time, the short circuit currents measured at a number of measurement points can be reduced to a low level. The areal weight of the carbon short fibers in the carbon short fiber sheet is more preferably from 15 to 35 $g/m^2$.

In the present invention, the resulting carbon short fiber sheet can be impregnated with a resin with a residual carbon rate of 35% (based on mass) or more, or the like, to prepare a composition containing the carbon short fibers and the resin (namely, a sheet obtained by impregnating the carbon short fiber sheet with a resin, hereinafter referred to as a precursor sheet), and the resulting composition is heated to carbonize the resin, to obtain a porous carbon electrode substrate.

The above described resin is carbonized while being baked, and is converted into an electrically conductive resin carbide. As a result, it is possible to obtain, after the baking, a porous carbon electrode substrate having a structure in which the carbon short fibers are bonded by the resin carbide. If necessary, a solvent or the like may be added to the resin. The use of a resin with a residual carbon rate of 35% by mass or more is preferred, because the resulting porous carbon electrode substrate has an excellent mechanical strength, electrical conductivity, and thermal conductivity. A higher carbonization yield is more preferred; however, the carbonization yield is 70% by mass or less, in general, at the current technical level.

Examples of the resin to be used for impregnating the carbon short fiber sheet to form the precursor sheet include: thermosetting resins such as phenol resins, epoxy resins, melamine resins, and furan resins. Among these, a phenol resin is preferably used, because of its high residual carbon rate.

It is also preferred that a carbon powder, such as a graphite powder, a carbon black, or a carbon nanotube, be incorporated into the resin. When a carbon powder is incorporated into the resin, the resulting porous carbon electrode substrate also contains the carbon powder, and this enables to prevent the occurrence of shrinkage or cracks during the carbonization of the resin, and to prevent the falling of the carbon short fibers and the occurrence of a short circuit current in the polymer electrolyte membrane, resulting from a decrease in the bond between the resin carbide and the carbon short fibers. As a result, the short circuit current can be reduced to a low level. In order to obtain such effects, the carbon powder preferably has a mean particle size (mean particle size D50, as measured by the laser diffraction method) of from 1 to 10 µm.

The porous carbon electrode substrate to be used in the gas diffusion electrode according to the present invention is composed of carbon short fibers bonded with a resin carbide. The porous carbon electrode substrate has a bulk density of from 0.20 to 0.40 $g/cm^3$, preferably from 0.22 to 0.38 $g/cm^3$, and more preferably from 0.24 to 0.36 $g/cm^3$. The bulk density of the porous carbon electrode substrate is selected as appropriate, depending on the operation conditions of a fuel cell. For use in a fuel cell in which the moisturization of the electrolyte membrane is required, a porous carbon electrode substrate having a higher bulk density is preferred; whereas for use in a fuel cell which requires gas diffusivity and water removal performance, a porous carbon electrode substrate having a lower bulk density is preferred.

The bulk density of the porous carbon electrode substrate is calculated from the mass and the thickness of a sample of the electrode substrate cut into a square of 10 cm. The thickness of the sample is measured using a dial gauge with a probe having a diameter of 5 mm, at a measurement pressure of 0.15 MPa. When the porous carbon electrode substrate has a bulk density of less than 0.20 $g/cm^3$, it becomes difficult to prevent the falling of the carbon short fibers, and the short circuit current cannot be reduced to a low level. When the porous carbon electrode substrate has a bulk density of more than 0.40 $g/cm^3$, on the other hand, the resulting gas diffusion electrode has poor gas diffusivity and fuel cell performance.

Further, the porous carbon electrode substrate to be used in the gas diffusion electrode according to the present invention has an areal weight ratio defined below of from 0.3 to 0.65. The porous carbon electrode substrate preferably has an areal weight ratio of from 0.32 to 0.63, and more preferably from 0.34 to 0.60.

The areal weight ratio as used herein refers to a value obtained by the equation $(A-B)/B$.

In the above equation, A represents the areal weight $(g/m^2)$ of the porous carbon electrode substrate, and B represents the areal weight $(g/m^2)$ of the carbon short fibers in the porous carbon electrode substrate.

In cases where the areal weight of the carbon short fibers is measured using the carbon short fiber sheet before being impregnated with the resin, the un-impregnated carbon short fiber sheet is heated in air at 400° C. for 8 hours to thermally decompose materials other than the carbon short fibers, such as binders and pulp, before use.

When the porous carbon electrode substrate has an areal weight ratio of less than 0.3, the amount of the resin carbide bonding between the carbon short fibers is small, possibly causing an increase in the short circuit current, or a decrease in the strength or electrical conductivity. When the porous carbon electrode substrate has an areal weight ratio of more than 0.65, the resin carbide bonding the carbon short fibers may be excessively spread between the carbon short fibers in a web-like manner, to inhibit the mass transfer of hydrogen and oxygen necessary for a power generation reaction, and of water generated by the power generation reaction, possibly resulting in a decrease in the fuel cell performance, particularly under high-humidity conditions.

Still further, in the porous carbon electrode substrate to be used in the gas diffusion electrode according to the present invention, when the region of the porous carbon electrode substrate, extending from a plane that has the 50% filling rate defined below and is closest to one surface of the substrate to a plane that has the 50% filling rate and is closest to the other surface thereof, is trisected in the through-plane direction to obtain three layers, a layer located closer to one surface has a layer filling rate defined below different from the layer filling rate of the layer located closer to the other surface. The 50% filling rate as used herein refers to a value obtained by measuring the filling rate of a plane at every certain length in the direction from one surface toward the other surface of the porous carbon electrode substrate, then calculating the mean value of the measured filling rates of planes, and further obtaining a value corresponding to 50% of the calculated mean value as the 50% filling rate. Further, the layer filling rate of a layer, as used herein, refers to the mean value obtained from the filling rates of planes constituting the layer. Note that the through-plane direction as described above refers to the thickness direction.

In addition, when the region of the porous carbon electrode substrate, extending from a plane that has the 50% filling rate and is closest to one surface of the substrate to a plane that has the 50% filling rate and is closest to the other surface thereof, is trisected in the through-plane direction to obtain three layers, and when the layer located closer to one surface of the porous carbon electrode substrate and having the highest layer filling rate is defined as a layer X, the layer located closer to the other surface and having a layer filling rate lower than that of the layer X is defined as a layer Y, and the layer located between the layer X and the layer Y is defined as a layer Z, it is preferred that the layer filling rates of these layers decrease in the order of the layer X, the layer Y, and the layer Z.

When the layer filling rate of the layer Y is taken as 1, it is more preferred that the layer X have a layer filling rate of 1.03 or more, and the layer Z have a layer filling rate of 0.97 or less.

The layer filling rate of the layer Z, when the layer filling rate of the layer Y is taken as 1, is more preferably 0.8 or less, and still more preferably 0.7 or less. By decreasing the layer filling rates of the layers Y and Z, the gas diffusivity within the porous carbon electrode substrate and the removal performance of water generated within the electrode substrate are markedly improved, as a result of which good anti-flooding characteristics are obtained. Further, the lower limit of the layer filling rate of the layer Z, when the layer filling rate of the layer Y is taken as 1, is not particularly limited; however the lower limit is preferably 0.14 or more, in view of the strength required for the post processing or for use in a fuel cell stack.

The layer filling rate of the layer X, when the layer filling rate of the layer Y is taken as 1, is more preferably 1.05 or more, and still more preferably 1.1 or more. By increasing the layer filling rate of the layer X, when the layer filling rate of the layer Y is taken as 1, the water generated in the layer Z located in the middle is more easily removed to the side of the layer Y having a sparse structure. Further, the upper limit of the layer filling rate of the layer X, when the layer filling rate of the layer Y is taken as 1, is preferably 2.5 or less, but not particularly limited thereto.

By selecting the surface of the porous carbon electrode substrate closer to the layer X as a surface on which a microporous layer is disposed, it is possible to reduce the short circuit current at the surface on which the microporous layer is disposed, and by adjusting the layer Z to have a low layer filling rate, a higher fuel cell performance can be obtained. In other words, the gas diffusion electrode according to the present invention preferably includes a microporous layer on the surface of the porous carbon electrode substrate closer to the layer X.

The layer filling rates of the layer X, the layer Y, and the layer Z can be obtained by three-dimensional X-ray CT scanning. The entire region in the through-plane direction of the porous carbon electrode substrate from one surface toward the other surface thereof is scanned at every certain length using a three-dimensional X-ray CT scanner, to obtain three-dimensional data of the porous carbon electrode substrate. By analyzing the thus obtained three-dimensional data, the filling rates of the measured planes can be obtained, and based on the measured filling rates, the layer filling rate of a certain layer can determined. The above described certain length (hereinafter, referred to as a slice pitch) can be selected arbitrarily, but it is defined herein to be not more than one third of the mean diameter of the carbon short fibers included in the porous carbon electrode substrate. Further, the above described through-plane direction refers to the thickness direction.

To obtain the filling rate of a plane located at a specific position in the through-plane direction of the porous carbon electrode substrate, a slice image corresponding to the specific position in the three-dimensional data is divided into 256 brightness levels from the minimum brightness to maximum brightness, using an image processing program "J-trim", and the image is then binarized taking the 175th brightness level from the minimum brightness as the threshold. The ratio of the area on the brighter side after the binarization, with respect to the total area, is the filling rate of a plane located at the specific position. The filling rate of a plane located at a specific position, obtained in the above manner, is determined at every certain length from one surface toward the other surface of the porous carbon electrode substrate, to obtain a distribution of the filling rates of planes at every certain length in the through-plane direction. The mean value is then determined from all the thus obtained values of the filling rates of planes, and the value corresponding to 50% (one half) of the calculated mean value is defined as the 50% filling rate.

Further, when the region of the porous carbon electrode substrate, extending from a plane that has the 50% filling rate and is closest to one surface of the substrate to a plane that has the 50% filling rate and is closest to the other surface thereof, is trisected in the through-plane direction to obtain three layers, the mean value obtained from the filling rates of planes constituting each of these three layers is defined as the layer filling rate of each layer.

Of the three layers obtained by the trisection, the layer located closer to one surface of the porous carbon electrode substrate and having the highest layer filling rate is defined as the layer X, the layer located closer to the other surface and having a layer filling rate lower than that of the layer X is defined as the layer Y, and the layer located between the layer X and the layer Y is defined as the layer Z.

The measurement field for one measurement, for calculating the filling rate of a plane, varies depending on the slice pitch. Therefore, a plurality of measurements are carried out such that the total area of the measurement fields is 5 mm$^2$ or more, and the mean value of the measured values are calculated to determine the layer filling rate.

As the three-dimensional X-ray CT scanner to be used in the measurement, SMX-160CTS manufactured by Shimadzu Corporation or an equivalent apparatus is used. Since carbon short fibers having a mean diameter of 7 μm are used in Examples to be described later, the number of times for measuring the filling rate of one plane was selected to be 7 times, in order to determine the filling rate of a plane at a slice pitch of 2.1 μm, a measurement field of 1,070 μm, and the total area of the measurement fields of 5 mm$^2$ or more.

The porous carbon electrode substrate according to the present invention in which the layer filling rates are adjusted to decrease in the order of the layer X, the layer Y, and the layer Z, can be obtained by adjusting the mean diameter of the carbon short fibers included in the porous carbon electrode substrate or the density of the porous carbon electrode substrate, or by controlling the distribution of the resin in the precursor sheet before being heated and carbonized in the through-plane direction (thickness direction). However, such a porous carbon electrode substrate is more preferably obtained by controlling the distribution of the resin.

To control the distribution of the resin in the through-plane direction, a method may be used in which, as the above described precursor sheet impregnated with a resin, three pieces of precursor sheets varying in the amount of resin impregnated are prepared, and these precursor sheets are subjected to lamination molding, followed by carbonization, to obtain the porous carbon electrode substrate. Alternatively, a method may be used in which one piece of precursor sheet having a distribution of the amount of resin deposited is prepared, by using a resin application method capable of generating a distribution of the amount of resin deposited, when impregnating the resin into a porous body such as a precursor sheet, and the prepared sheet is then molded without lamination and carbonized, to obtain the porous carbon electrode substrate. However, when the porous carbon electrode substrate is obtained by laminating precursor sheets varying in the amount of resin impregnated, sudden changes in the filling rate are likely to occur at the lamination interfaces; and therefore, the method of producing the porous carbon electrode substrate from one piece of precursor sheet is preferred. Further, since the method of producing the porous carbon electrode substrate from one piece of precursor sheet allows for easily reducing the thickness of the resulting porous carbon electrode substrate, it is suitable for adjusting the thickness thereof within a preferred range.

In the present invention, the porous carbon electrode substrate which has been subjected to a hydrophobic treatment by applying a fluorine resin thereto is suitably used. Since a fluorine resin functions as a hydrophobic polymer, the porous carbon electrode substrate to be used in the present invention preferably contains a hydrophobic polymer such as a fluorine resin. Examples of the hydrophobic polymer to be contained in the porous carbon electrode substrate, namely the fluorine resin to be contained in the porous carbon electrode substrate, include PTFE (polytetrafluoroethylene) (such as "Teflon" (registered trademark)), FEP (tetrafluoroethylene-hexafluoropropylene copolymer), PFA (perfluoroalkoxy fluorine resin), ETFA (ethylene-tetrafluoroethylene copolymer), PVDF (polyvinylidene fluoride), and PVF (polyvinyl fluoride). Among these, preferred is PTFE or FEP, which exhibits a strong hydrophobicity.

The amount of the hydrophobic polymer is not particularly limited; however a suitable amount thereof is 0.1% by mass or more and 20% by mass or less, with respect to 100% by mass of the total amount of the porous carbon electrode substrate. An amount of the hydrophobic polymer of less than 0.1% by mass may lead to insufficient hydrophobicity; whereas an amount thereof exceeding 20% by mass may possibly result in the clogging of pores which serve as gas diffusion paths or water drainage paths, or in an increase in electrical resistance.

The hydrophobic treatment of the porous carbon electrode substrate can be carried out by a treatment technique of dipping the porous carbon electrode substrate in a dispersion containing a commonly known hydrophobic polymer; or by a technique of coating the carbon electrode substrate with a hydrophobic polymer by die coating, spray coating, or the like. Further, the porous carbon electrode substrate can also be processed by a dry process, such as sputtering of a fluorine resin. If necessary, the hydrophobic treatment may be followed by a drying process, and further by a sintering process.

Next, a description will be given regarding the microporous layer.

In the present invention, the porous carbon electrode substrate has a microporous layer on at least one surface thereof. The microporous layer is a layer containing electrically conductive fine particles, such as, for example, any of carbon blacks, carbon nanotubes, carbon nanofibers, chopped fibers of carbon fibers, graphene, and graphite.

It is preferred that the microporous layer include at least a first microporous layer which is in contact with the porous carbon electrode substrate, and a second microporous layer. The number of layers constituting the microporous layer is not particularly limited. However, particularly preferred is a two-layer configuration composed of the first microporous layer which is in contact with the porous carbon electrode substrate, and the second microporous layer which is in contact with the first microporous layer and which is present on the outermost surface. First, matters common to each microporous layer will be described.

Each microporous layer is a layer containing electrically conductive fine particles, such as, for example, any of carbon blacks, carbon nanotubes, carbon nanofibers, chopped fibers of carbon fibers, graphene, and graphite. A carbon black is preferably used as the electrically conductive fine particles, because of its low cost, high safety, and stable product quality. In other words, it is preferred that, in the present invention, the first microporous layer and the second microporous layer both contain a carbon black. As the carbon black to be contained in the first microporous layer and the second microporous layer, acetylene black is preferably used, because it has a low impurity content and is less likely to cause a decrease in catalyst activity. As an index of the impurity content in the carbon black, the content of ash may be used, for example, and it is preferable to use a carbon black having an ash content of 0.1% by mass or less. The lower the ash content in the carbon black, the more preferred. Particularly preferred is a carbon black having an ash content of 0% by mass, namely a carbon black containing no ash.

Further, it is also preferred that the microporous layer, contain a hydrophobic polymer, such as a fluorine resin, in addition to the electrically conductive fine particles, because the microporous layer is required to have properties such as electrical conductivity, gas diffusivity, water removal performance, moisture retention, thermal conductivity and/or the like, as well as resistance to strong acids on the anode side and oxidation resistance on the cathode side in the interior of a fuel cell. Examples of the fluorine resin to be contained in the microporous layer include PTFE, FEP, PFA, and ETFA, as exemplified above as the fluorine resins suitably used for imparting hydrophobicity to the porous carbon electrode substrate. Among these, PTFE, or FEP is preferred because of its particularly high hydrophobicity.

To include a microporous layer in the gas diffusion electrode, in general, an ink for forming a microporous layer, namely a microporous layer-forming ink (hereinafter, referred to as ink) is coated on the porous carbon electrode substrate. The ink usually contains the above described electrically conductive fine particles and a dispersion medium such as water or an alcohol, and often contains a surfactant or the like as a dispersant for dispersing the electrically conductive fine particles. In the case of incorporating a hydrophobic polymer into the microporous layer, it is preferred that the hydrophobic polymer be incorporated into the ink, in advance.

To form a microporous layer on the porous carbon electrode substrate, a transfer method is also known in which the ink is once coated on a substrate such as PET film, and the surface of the coated microporous layer is crimped onto the porous carbon electrode substrate, followed by peeling off the substrate film. However, the production process of the transfer method is complicated, and in addition, there are cases where adhesion between the porous carbon electrode substrate and the microporous layer may be insufficient. Accordingly, the microporous layer is preferably formed by a method in which the ink is coated on the porous carbon electrode substrate.

The concentration of the electrically conductive fine particles in the ink is preferably 5% by mass or more, and more preferably 10% by mass or more, in terms of productivity. There is no upper limit to the concentration, as long as the concentration allows for obtaining a suitable viscosity, dispersion stability of the electrically conductive particles, coatability of the ink, and the like. In cases where acetylene black is used as the electrically conductive fine particles, and when the ink is an aqueous ink, the concentration of acetylene black in the ink is preferably about 25% by mass. When the concentration is, adjusted within the above preferred range, there is no risk that particles of acetylene black are reaggregated to result in the occurrence of a so-called percolation, and it is less likely to result in the deterioration of coatability due to a sudden increase in the viscosity.

The roles of the microporous layer are, for example: (1) a catalyst protection effect; (2) a make-up effect for preventing the coarse surface of the porous carbon electrode substrate from being transferred to an electrolyte membrane; (3) an effect of preventing the condensation of water vapor generated at the cathode; and the like. In order to obtain the make-up effect, of the above described effects, the microporous layer preferably has a certain thickness.

The microporous layer included in the gas diffusion electrode according to the present invention has a thickness under an added pressure of 0.15 MPa of from 28 to 45 μm, and has a thickness under an added pressure of 2 MPa of from 25 to 35 μm. When the microporous layer has a thickness under an added pressure of 0.15 MPa of less than 28 μm, it becomes difficult to control the thickness thereof under an added pressure of 2 MPa to 25 μm or more; whereas when the microporous layer has a thickness under an added pressure of 0.15 MPa of more than 45 μm, it becomes difficult to prevent the occurrence of surface cracks in the microporous layer. When the microporous layer has a thickness under an added pressure of 2 MPa of less than 25 μm, it becomes difficult to prevent the carbon short fibers in the porous carbon electrode substrate from piercing into the electrolyte membrane; whereas when the microporous layer has a thickness under an added pressure of 2 MP of more than 35 μm, it becomes difficult to maintain a high porosity, resulting in a low gas diffusivity.

The microporous layer preferably has a thickness under an added pressure of 0.15 MPa of from 30 to 43 μm, and more preferably from 32 to 41 μm. The microporous layer preferably has a thickness under an added pressure of 2 MPa of from 26 to 34 μm, and more preferably from 27 to 33 μm.

In the case of measuring the thickness of each layer in a gas diffusion electrode including the porous carbon electrode substrate, the first microporous layer, and the second microporous layer, it is possible to use a method in which an ion milling apparatus, such as IM 4000 manufactured by Hitachi High-Tech Solutions Corporation, is used to cut the gas diffusion electrode in the thickness direction, and the thickness of each layer is calculated from an SEM image obtained by observing the cross section in the through-plane (cross section in the thickness direction) with a scanning electron microscope (SEM).

The ink is prepared by dispersing the electrically conductive fine particles using a dispersant, as described above. To disperse the electrically conductive fine particles, it is preferred that the dispersion be achieved by using a dispersant in an amount of 0.1% by mass or more and 5% by mass or less with respect to 100% by mass of the total content of the electrically conductive fine particles and the dispersant. Note, however, that it is effective to increase the added amount of dispersant, in order to maintain the above described dispersion stable for a prolonged period of time, thereby preventing an increase in the viscosity of the ink and the separation of the liquid.

Further, in the case of adjusting the thickness of the microporous layer to a thickness within the above described range, it is preferred that the viscosity of the ink be maintained at least at 1,000 mPa·s or more. When the viscosity of the ink is lower than 1,000 mPa·s, there are cases where the ink flows off the surface of the porous carbon electrode substrate, or where the ink flows into the pores of the porous carbon electrode substrate to result in the occurrence of bleed-through. On the other hand, too high a viscosity of the ink may result in a decrease in the coatability, and thus, the upper limit of the viscosity of the ink is about 25 Pa·s. The viscosity of the ink is preferably 3,000 mPa·s or more and 20 Pa·s or less, and more preferably 5,000 mPa·s or more 15 Pa·s or less.

The coating of the ink on the porous carbon electrode substrate can be carried out using various types of commercially, available coating apparatuses. Examples of coating methods which can be used include: screen printing, rotary screen printing, spraying, intaglio printing, gravure printing, die coater coating, bar coating, blade coating, and knife coater coating. Among these, a coating method using a die coater is preferred, since it allows for quantifying the coating amount of the ink, regardless of the surface roughness of the porous carbon electrode substrate. Further, in cases where the gas diffusion electrode is assembled into a fuel cell, and the smoothness of the coated surface is required in order to enhance the adhesion to a catalyst layer, a coating method by a blade coater or a knife coater is suitably used. The coating methods exemplified above are presented merely for illustrative purposes, and the coating method to be used is not necessarily limited thereto.

After the coating of the ink, the dispersion medium (water, in the case of using an aqueous medium) contained in the ink is removed by drying, as necessary. In cases where water is used as the dispersion medium, the drying after the coating is preferably carried out at a temperature of from room temperature (around 20° C.) to 150° C. or lower, and more preferably 60° C. or higher and 120° C. or lower. The drying of the dispersion medium (such as water) may be carried out collectively in the subsequent sintering process.

After the coating of the ink, sintering is carried out, in general, for the purposes of removing the surfactant used in the ink, and of melting the hydrophobic polymer once, to bond the electrically conductive fine particles.

The sintering is preferably carried out at a temperature of 250° C. or higher and 400° C. or lower, although it varies depending on the boiling point or the decomposition temperature of the surfactant added. When the sintering is carried out at a temperature of less than 250° C., the removal of the surfactant may not be sufficiently achieved, or an enormous amount of time may be required for completely removing the surfactant. On the other hand, when the sintering is carried out at a temperature higher than 400° C., there is a possibility that the hydrophobic polymer may be decomposed.

In terms of productivity, the sintering is carried out for the shortest period of time possible, preferably for a period of time within 20 minutes, more preferably within 10 minutes, and still more preferably within 5 minutes. However, when the sintering is carried out within too short a period of time, it results in the sudden generation of the vapor of the surfactant or the decomposition products, and causes a risk for combustion in the case of carrying out the sintering in the atmosphere.

The temperature and the period of time optimum for carrying out the sintering are selected, taking into consideration the melting point or the decomposition temperature of the hydrophobic polymer, and the decomposition temperature of the surfactant.

The gas diffusion electrode according to the present invention preferably has a short circuit current density in the thickness direction, as measured in a state where a polymer electrolyte membrane having a thickness of 25 µm is laminated on the microporous layer and while applying a voltage of 2 V and an added pressure of 5 MPa thereto, of 11 mA/cm$^2$ or less at 90% or more of measurement points. The short circuit current as defined in the present invention refers to a value obtained according to the following procedures (1) to (3).

(1) A polymer electrolyte membrane "Nafion" (registered trademark) NR211 (manufactured by DuPont) having a film thickness of 25 µm is laminated on the surface of the microporous layer of the gas diffusion electrode. At this time, the gas diffusion electrode is cut into a square with a side length of 5 cm, and the polymer electrolyte membrane is cut into a square with a side length of 6 cm or more. Subsequently, the polymer electrolyte membrane and the gas diffusion electrode are laminated such that the respective sides of the polymer electrolyte membrane and the respective sides of the gas diffusion electrode are aligned in parallel, and the center of the polymer electrolyte membrane coincides with that of the gas diffusion electrode.

(2) The thus layered polymer electrolyte membrane and the gas diffusion electrode are sandwiched between two pieces of gold-plated stainless steel block electrodes (the sandwiching surfaces thereof are each in the shape of a square with a side length of 3 cm), and pressurized such that an added pressure of 5 MPa is applied to a 9 cm$^2$ area of the gas diffusion electrode. At this time, the sandwiching is done such that the respective sides of the sandwiching surfaces of the stainless steel block electrodes and the respective sides of the gas diffusion electrode are aligned in parallel, and the centers of the stainless steel block electrodes coincide with the center of the gas diffusion electrode.

(3) Using a digital multi-meter (KEITHLEY Model 196 SYSTEM DMM), a direct voltage of 2 V is applied between the gold-plated stainless steel block electrodes, and a value obtained by measuring the current between the electrodes is defined as the short circuit current. The short circuit current density is defined as a value obtained by dividing the thus obtained short circuit current by 9 cm$^2$, which is the area of the gas diffusion electrode to which the voltage and the added pressure are applied.

The procedures (1) to (3) are repeated 10 times, replacing the measurement sample of the gas diffusion electrode with a new one each time, and the mean value of the short circuit currents is determined based on the probability of the thus measured value exceeding 11 mA/cm$^2$.

The gas diffusion electrode according to the present invention preferably has a short circuit current density as measured by the above described method of 11 mA/cm$^2$ or less at 90% or more of the measurement points. When the gas diffusion electrode has a short circuit current density within the above preferred range, it indicates a low possibility that a short circuit current is generated in the polymer electrolyte membrane, due to the protruding parts, such as carbon short fibers protruding from the gas diffusion electrode. Accordingly, even in cases where a fuel cell including the gas diffusion electrode is used in a long-term operation, it is possible to prevent a decrease in the fuel cell performance. The short circuit current density of the gas diffusion electrode as measured by the above described method is more preferably 11 mA/cm$^2$ or less at 95% or more and 100% or less of the measurement points, and still more preferably 11 mA/cm$^2$ or less at 99% or more and 100% or less of the measurement points, in terms of preventing a decrease in the fuel cell performance.

The reduction of the short circuit current to a low level, as well as the reduction of the short circuit currents measured at a number of measurement points to a low level, can be achieved by increasing the ratio of the resin carbide bonding the carbon short fibers in the porous carbon electrode substrate, or by increasing the bulk density of the porous carbon electrode substrate. However, at the same time, it is preferable not to excessively increase the ratio of the resin carbide and the bulk density of the porous carbon electrode substrate, in terms of preventing a decrease in the gas diffusivity of the porous carbon electrode substrate.

It is also preferred that the microporous layer of the gas diffusion electrode according to the present invention include at least the first microporous layer which is in contact with the porous carbon electrode substrate, and the second microporous layer; and that the first microporous layer contain a carbon black having a structure index of 3.0 or more, and the second microporous layer contain a carbon black having a structure index of less than 3.0.

The pore size of the first microporous layer can be controlled by selecting the type of the electrically conductive fine particles to be incorporated into a first ink or adjusting the degree of dispersion thereof; or alternatively, by selecting the particle size or the shape of the electrically conductive fine particles. The use of a carbon black as the electrically conductive fine particles is preferred, because of its inexpensiveness, easy availability, highly reliable safety, and the like. The first microporous layer preferably contains a carbon black having a structure index of 3.0 or more. When the structure index is within the above preferred range, the pore size distribution in the first microporous layer can be appropriately controlled, and as a result, it is possible to obtain a gas diffusion electrode which is excellent in gas diffusivity, and in which the thickness under a specific added pressure is controlled.

The structure index as used herein refers to a value obtained by dividing the value of DBP oil absorption (cc/100 g) of the carbon black, by the value of BET specific surface area ($m^2/g$) thereof. A larger value of the structure index indicates that the branching structure of the agglomerates of the carbon black is more extensively spread, and that larger pores are more likely to be formed within the coated film. The upper limit of the structure index of the carbon black in the first microporous layer is preferably about 4.5. When the structure index is within the above preferred range, the occurrence of cracks between the agglomerates of the carbon black can be prevented.

As the second microporous layer, it is preferable to form a dense coated film having a low porosity, by: adjusting the degree of dispersion of the electrically conductive fine particles to be incorporated into a second ink to a high level so as to form a dense coated film; using electrically conductive fine particles having a smaller particle size; or the like. In cases where a carbon black is used as the electrically conductive fine particles, the extent of the decrease in the pore size of the coated film depends on how finely the particles having a secondary particle size (diameter of the particles aggregated to a certain degree) can be dispersed, since the particles having a primary particle size cannot be dispersed. In view of the above, the second microporous layer preferably contains a carbon black having a structure index of less than 3.0. The carbon black to be contained in the second microporous layer more preferably has a structure index of 2.7 or less. As the carbon black to be contained in the second microporous layer, it is preferable to use one having a structure index of 1.5 or more. When the structure index is within the above preferred range, the electrical conductivity of the carbon black is not reduced, and an excessive decrease in the viscosity is less likely to occur when the carbon black is formed into an ink.

When the gas diffusion electrode includes the first microporous layer containing a carbon black having a structure index of 3.0 or more, and the second microporous layer containing a carbon black having a structure index of less than 3.0, the thickness of the microporous layers under an added pressure of 0.15 MPa and the thickness of the microporous layers under an added pressure of 2 MPa can be adjusted within the above described ranges.

In the present invention, the first microporous layer is formed first, and then the second ink is coated to form the second microporous layer. The second ink preferably has a viscosity that is lower than the viscosity of the first ink, and it is desirable to have a viscosity of 10 Pa·s or less.

In order to maintain a high viscosity of the ink, as described above, it is effective to add a thickener to the ink. The thickener to be used at this time may be a generally known thickener. For example, a methyl cellulose thickener, a polyethylene glycol thickener, a polyvinyl alcohol thickener or the like is suitably used.

As the above described dispersant and thickener, it is possible to use one substance having two functions, or to select separate materials suitable for providing the respective functions. Note, however, that in the case of separately selecting the thickener and the dispersant, it is preferable to select those which do not disrupt a dispersion system of the electrically conductive fine particles and a dispersion system of a fluorine resin as the hydrophobic polymer. The above described dispersant and thickener are herein collectively referred to as the surfactant. In the present invention, the total amount of the surfactant is preferably 50 parts by mass or more, more preferably 100 parts by mass or more, and still more preferably 200 parts by mass or more, with respect to the added mass of the electrically conductive fine particles. The upper limit of the added amount of the surfactant is usually 500 parts by mass or less with respect to the added mass of the electrically conductive fine particles. An added amount of the surfactant exceeding the upper limit may possibly cause the generation of a large amount of vapor or decomposition gas during the subsequent sintering process, resulting in a decrease in safety and productivity.

The drying and sintering may be carried out after the completion of each of the coating of the first ink and the coating of the second ink; however, it is preferred that the drying and sintering be carried out collectively after the completion of both the coating of the first ink and the coating of the second ink.

In the present invention, the total thickness of the microporous layers is preferably 50 μm or less, and more preferably 40 μm or less, in terms of increasing the gas diffusivity and decreasing the electrical resistance.

The total thickness of the microporous layers as, used herein refers to the total thickness of the first microporous layer and the second microporous layer which are disposed on one surface of the porous carbon electrode substrate. Even in cases where the microporous layers are disposed on both surfaces of the porous carbon electrode substrate, the total thickness refers to that of the first microporous layer and the second microporous layer disposed only on one surface of porous carbon electrode substrate.

An apparatus suitable for producing the gas diffusion electrode according to the present invention includes: an unwinder for unwinding the continuous porous carbon electrode substrate wound in the form of a roll; a first coating machine for coating the first ink on the porous carbon electrode substrate unwound by the unwinder; a second coating machine for coating the second ink on the porous carbon electrode substrate on which the first ink has been coated but not substantially dried, which coating machine is disposed on the same side as the side of the substrate surface on which the first coating machine is disposed; a drying furnace for drying the porous carbon electrode substrate on which the first ink and the second ink have been coated; and a winder for winding the resulting gas diffusion electrode.

The gas diffusion electrodes according to the present invention are assembled into a single cell by being crimped on both sides of an electrolyte membrane which is provided with catalyst layers on both surfaces, such that the catalyst layers and the gas diffusion electrodes are in contact with each other, followed by incorporating members such as bipolar plates, to be used as a fuel cell. At this time, it is preferred that the assembly is done such that the second microporous layers are in contact with the catalyst layers.

It is preferred that the method of producing the gas diffusion electrode according to the present invention include, in the order mentioned: a compression step of subjecting a precursor fiber sheet to a pressure treatment; a carbonization step of subjecting the pressure treated precursor fiber sheet to a heat treatment to convert a resin into the resin carbide, to obtain the porous carbon electrode substrate; and a microporous layer forming step of forming a microporous layer on one surface of the porous carbon electrode substrate. In the above described method, the precursor fiber sheet after being subjected to the pressure treatment in the compression step preferably has a carbon short fiber density of from 0.14 to 0.2 g/cm$^3$.

In cases where a carbon short fiber sheet containing a resin (referred to as a precursor sheet) is used as the composition containing the carbon short fibers and the resin, it is also preferred that the precursor sheet be molded by heating and pressurization, before being subjected to carbonization by heating. The above described molding enables to more appropriately adjust the thickness and the porosity of the resulting porous carbon electrode substrate. The molding of the sheet is preferably carried out at a temperature of from 100 to 250° C., while applying an added pressure of from 0.01 to 5 MPa.

The reduction of the short circuit current to a low level, as well as the reduction of the short circuit currents measured at a number of measurement points to a low level, can be achieved in a preferred manner by increasing the rate of temperature rise during the heat treatment in the carbonization step, in the production method including the following steps in the following order: the compression step of subjecting a precursor fiber sheet to a pressure treatment; the carbonization step of subjecting the pressure treated precursor fiber sheet to a heat treatment to convert a resin into the resin carbide, to obtain the porous carbon electrode substrate; and the microporous layer forming step of forming a microporous layer on one surface of the porous carbon electrode substrate. Since an increase in the rate of temperature rise results in a low amount of shrinkage in the thickness during the carbonization in the heat treatment, it is preferable to apply a high pressure to the sheet in the compression step, which is a pre-step, so as to reduce the thickness of the sheet in advance. By adjusting the carbon short fiber density of the precursor fiber sheet after being subjected to the pressure treatment in the compression step within the range of from 0.14 to 0.2 g/cm$^3$, the carbon short fibers are more likely to be oriented in the in-plane direction, the bond between the resin carbide and the carbon short fibers is further improved, and the short circuit current is reduced as a result of the carbon short fibers being less susceptible to falling from the sheet. In terms of reducing the short circuit current, the carbon short fiber density of the precursor fiber sheet after being subjected to the pressure treatment is more preferably from 0.142 to 0.195 g/cm$^3$, and still more preferably from 0.145 to 0.19 g/cm$^3$.

Since an increase in the rate of temperature rise in the carbonization step results in a low amount of shrinkage in the thickness during the carbonization in the heat treatment, the average rate of temperature rise from the temperature at the entrance of a furnace (room temperature) to the highest temperature in the furnace, in the carbonization step, is preferably from 2,000 to 15,000° C./min. In cases where two-stage heating is performed using a low-temperature furnace and a high-temperature furnace, adjusting the rate of temperature rise in at least one of the furnaces, preferably in both of the furnaces, within this range is effective for preventing the protrusion of the carbon short fibers from the surface of the porous carbon electrode substrate.

Further, there are cases where it is possible to achieve the reduction of the short circuit current density to 11 mA/cm$^2$ or less at 90% or more of the measurement points, by using only one of the several methods described so far. In cases where the reduction cannot be achieved in this way, it is preferred to use a method of removing the carbon short fibers protruding from the surface of the porous carbon electrode substrate, in combination with any of the methods as described above. Particularly preferred is a method in which the porous carbon electrode substrate is subjected to calendering, followed by blowing and suction of air.

<Measurement of Open Circuit Voltage (OCV) of Membrane Electrode Assembly>

The measurement of the open circuit voltage (OCV) of a membrane electrode assembly was carried out according to the following procedures.

(1) A quantity of 1.0 g of carbon material of carbon-supported platinum catalyst (platinum supporting amount: 50% by mass; manufactured by Tanaka Kikinzoku Kogyo K.K.), 1.0 g of purified water, 8.0 g of a solution of "Nafion" (registered trademark) (5.0% by mass of "Nafion" (registered trademark); manufactured by Sigma-Aldrich Co. LLC.), and 18.0 g of isopropyl alcohol (manufactured by Nacalai Tesque, Inc.) were added sequentially, to prepare a catalyst liquid.

Next, a "NAFLON" (registered trademark) PTFE tape, "TOMBO" (registered trademark) No. 9001 (manufactured by NICHIAS Corporation) cut into a size of 5 cm×5 cm was coated with the above prepared catalyst liquid by spraying, followed by drying at normal temperature, to prepare a PTFE sheet provided with a catalyst layer having a platinum content of 0.3 mg/cm$^2$. Subsequently, a solid polymer electrolyte membrane "Nafion" (registered trademark) NR-211 (manufactured by DuPont) cut into a size of 8 cm×8 cm was sandwiched between two pieces of PTFE sheets each provided with a catalyst layer, and pressed at 130° C. for 5 minutes while applying an added pressure of 5 MPa using a pressing machine with flat plates, thereby transferring the respective catalyst layers onto the solid polymer electrolyte membrane. After pressing, the PTFE sheets were peeled off, to prepare a solid polymer electrolyte membrane provided with the catalyst layers.

(2) The solid polymer electrolyte membrane provided with the catalyst layers was sandwiched between two pieces of gas diffusion electrodes each cut into a size of 5 cm×5 cm, and pressed at 130° C. for 5 minutes while applying an added pressure of 3 MPa, using the pressing machine with flat plates, to prepare a membrane electrode assembly. The gas diffusion electrodes were arranged such that the surfaces thereof having the microporous layers were in contact with the catalyst layers on the polymer electrolyte membrane.

(3) The thus obtained membrane electrode assembly and bipolar plates were used to assemble a fuel cell evaluation unit cell. As each of the bipolar plates, a serpentine type bipolar plate with a single flow channel was used, in which the channel width, the channel depth, and the rib width are all 1.0 mm. The temperature of the cell was set to 80° C., and non-pressurized hydrogen was supplied to the anode side, and non-pressurized air was supplied to the cathode side. The hydrogen and air were both humidified using a humidification pot whose temperature was set at 40° C. The bipolar plate on the anode side and the bipolar plate on the cathode side were not electrically connected by an external circuit, and the hydrogen and air were supplied under open circuit conditions for 2 hours, and then the potential difference (OCV) between the anode and the cathode was measured.

EXAMPLES

The present invention will now be specifically described by way of Examples. The materials, the method of producing a porous carbon electrode substrate, the method of producing microporous layers, and the method of evaluating short circuit currents, which are used in Examples, are shown below.

Example 1

<Materials>
Porous Carbon Electrode Substrate

PAN-based carbon fibers "TORAYCA" (registered trademark) T300 (mean diameter: 7 μm) manufactured by Toray Industries, Inc. were cut into short fibers having a mean length of 12 mm. The short fibers were dispersed in water, and then subjected to a continuous paper-making by a wet papermaking method. Further, a 10% by mass aqueous solution of polyvinyl alcohol as a binder was coated on the thus produced paper, followed by drying, to prepare a carbon short fiber sheet in which the areal weight of the carbon short fibers was 26 g/m². The deposited amount of polyvinyl alcohol was 18 parts by mass with respect to 100 parts by mass of the carbon fibers.

Next, a phenol resin obtained by mixing a resol type phenolic resin and a novolak type phenolic resin so as to achieve a mass ratio of non-volatile components of 1:1, as a thermosetting resin, flake graphite (mean particle size: 5 μm) as a carbon powder, and methanol as a solvent were mixed at a blending ratio of: thermosetting resin (non-volatile component)/carbon powder/solvent=10 parts by mass/5 parts by mass/85 parts by mass, to obtain a uniformly dispersed resin composition (mixed liquid).

Subsequently, the carbon short fiber sheet was subjected to a resin impregnation step in which the sheet was continuously dipped in the mixed liquid of the resin composition and then sandwiched between rolls and squeezed, and then wound into a roll, to obtain a precursor fiber sheet. At this time, two rolls were arranged horizontally spaced apart by a certain clearance, and the carbon short fiber sheet was pulled vertically upward therebetween, to adjust the deposited amount of the resin composition in the entire fiber sheet. Further, the two rolls having the following configurations were used: one of the two rolls was a smooth metal roll having a structure which allows for removing the excessive resin composition with a doctor blade, and the other roll was a gravure roll provided with irregularities. The carbon short fiber sheet was sandwiched between the rolls such that one surface thereof is in contact with the metal roll, and the other surface thereof is in contact with the gravure roll, to squeeze out the impregnated liquid of the resin composition, so that the deposited amount of the resin composition on one surface of the carbon short fiber sheet differs from that on the other surface. The deposited amount of the phenol resin in the precursor fiber sheet was 104 parts by mass with respect to 100 parts by mass of the carbon short fibers.

To a press molding machine, hot platens were set so as to be in parallel with each other, and a spacer was disposed on the lower hot platen. Then the resin-impregnated carbon fiber paper vertically sandwiched between release papers was intermittently transported therebetween, to be subjected to a compression treatment. At this time, the interval between upper and lower press face plates was adjusted so that the precursor fiber sheet after the pressure treatment has a desired carbon short fiber density.

The compression treatment was carried out by repeating heating and pressing, mold opening, and feeding of the carbon fiber paper, and the resulting sheet was wound into a roll. The carbon short fiber density of the precursor fiber sheet after being subjected to the pressure treatment in the compression step was measured to be 0.155 g/cm³.

The pressure treated precursor fiber sheet was introduced into a heating furnace which was maintained under a nitrogen gas atmosphere and in which the highest temperature was 2,400° C., and subjected to a carbonization step in which the sheet was baked while continuously being transported within the heating furnace. The resulting sheet was then wound into a roll, to obtain a porous carbon electrode substrate. The thus obtained porous carbon electrode substrate had a density of 0.29 g/cm³.

The resulting porous carbon electrode substrate was subjected to a continuous calendering, with craft papers arranged on both surfaces of the substrate. The craft papers were continuously taken up. Using a contactless dust removal cleaner, air was blown to and suctioned from both surfaces of the porous carbon electrode substrate which had been calendered.

The porous carbon electrode substrate, after the calendering had a thickness of 136 μm, and the layer X, the layer Z, and the layer Y had different layer filling rates.

The layer filling rates of the layer X, the layer Y, and the layer Z were measured using SMX-160CTS manufactured by Shimadzu Corporation. The entire region in the through-plane direction of the porous carbon electrode substrate from one surface toward the other surface thereof was scanned at every certain length using a three-dimensional X-ray CT scanner, to obtain three-dimensional data of the porous carbon electrode substrate. In order to determine the filling rate of a plane at a slice pitch of 2.1 μm, a measurement field of 1,070 μm, and the total area of the measurement fields of 5 mm² or more, the number of times for measuring the filling rate of one plane was selected to be 7 times.

To obtain the filling rate of a plane located at a specific position in the through-plane direction of the porous carbon electrode substrate, a slice image corresponding to the specific position in the three-dimensional data was divided into 256 brightness levels from the minimum brightness to maximum brightness, using an image processing program "J-trim", and the image was then binarized taking the 175th brightness level from the minimum brightness as the threshold. The ratio of the area on the brighter side after the binarization, with respect to the total area, is the filling rate of a plane located at the specific position. The filling rate of a plane located at a specific position, obtained in the above manner, was determined at every slice pitch described above from one surface toward the other surface of the porous carbon electrode substrate, to obtain a distribution of the filling rates of planes at every certain length in the through-plane direction. The mean value was then determined from all the thus obtained values of the filling rates of planes, and the value corresponding to 50% (one half) of the mean value was calculated as the 50% filling rate, to be 1.96%.

Subsequently, for each of the three layers obtained when the region of the porous carbon electrode substrate, extending from a plane that has the 50% filling rate and is closest to one surface of the substrate to a plane that has the 50% filling rate and is closest to the other surface thereof, is trisected in the through-plane direction, the mean value obtained from the filling rates of planes constituting the layer was calculated, as the layer filling rate. As a result, the layer X located closer to one surface and having the highest layer filling rate had a layer filling rate of 19.5%, the layer Y located closer to the other surface and having a layer filling rate lower than that of the layer X had a layer filling rate of 15.6%, and the layer Z located between the layer X and the layer Y had a layer filling rate of 11.5%.

Next, the method of producing microporous layers will be described.

<Materials>

Carbon black $CB_1$ having a structure index of 3.0 or more DBP oil absorption: 140 cc/100 g, BET specific surface area: 41 m²/g, structure index: 3.4

Carbon black $CB_2$ having a structure index of 3.0 or more DBP oil absorption: 125 cc/100 g, BET specific surface area: 41 m²/g, structure index: 3.1

Carbon black $CB_3$ having a structure index of less than 3.0 DBP oil absorption: 175 cc/100 g, BET specific surface area: 67 m²/g, structure index: 2.6)

Hydrophobic polymer

"Neoflon" (registered trademark) FEP dispersion ND-110 (FEP resin, manufactured by Daikin Industries, Ltd.)

Surfactant

"TRITON" (registered trademark) X-100 (manufactured by Nacalai Tesque, Inc.)

<Measurement of Thicknesses of Porous Carbon Fiber Base Substrate and Gas Diffusion Electrode>

The thicknesses of the porous carbon fiber base substrate and the gas diffusion electrode were measured using a dial gauge with a probe having a diameter of 5 mm, while applying a load of 0.15 MPa.

<Measurement of Thicknesses of Microporous Layers>

The total thickness of the microporous layers under an added pressure of 0.15 MPa is calculated by: measuring the thickness under an added pressure of 0.15 MPa of each of the porous carbon fiber base substrate and the gas diffusion electrode, using each of the samples thereof cut into a square of 3 cm; and then calculating the total thickness of the microporous layers from the difference between the thus measured thicknesses. The measurement of the thicknesses was carried out using a universal tester, with each sample sandwiched between face plates equipped with a displacement sensor, at a measurement pressure of 0.15 MPa.

In the same manner, the total thickness of the microporous layers under an added pressure of 2 MPa is calculated by: measuring the thickness under an added pressure of 2 MPa of each of the porous carbon fiber base substrate and the gas diffusion electrode, using each of the samples thereof cut into a square of 3 cm; and then calculating the total thickness of the microporous layers from the difference between the thus measured thicknesses. The measurement of the thicknesses was carried out using the universal tester, with each sample sandwiched between the face plates equipped with a displacement sensor, at a measurement pressure of 2 MPa.

<Preparation of Gas Diffusion Electrode>

While transporting the porous carbon electrode substrate wound into a roll and having a thickness of 136 μm, using a winding-type transportation apparatus, the electrode substrate was dipped in a dip tank filled with a hydrophobic polymer dispersion obtained by dispersing the polymer in water to a fluorine resin concentration of 5% by mass, to carry out a hydrophobic treatment. Subsequently, the treated porous carbon electrode substrate was dried in a drying furnace 7 set to 100° C. and then wound by a winder, to obtain a hydrophobically treated porous carbon electrode substrate. As the hydrophobic polymer dispersion, a FEP dispersion ND-110 which had been diluted with water to a FEP resin concentration of 5% by mass was used.

Figure 1:
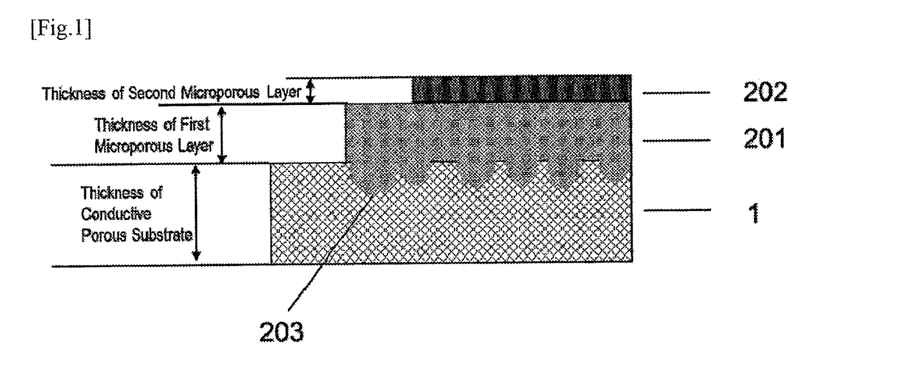
FIG. 1 is a schematic diagram showing the configuration of a gas diffusion electrode according to the present invention.
Figure 2:
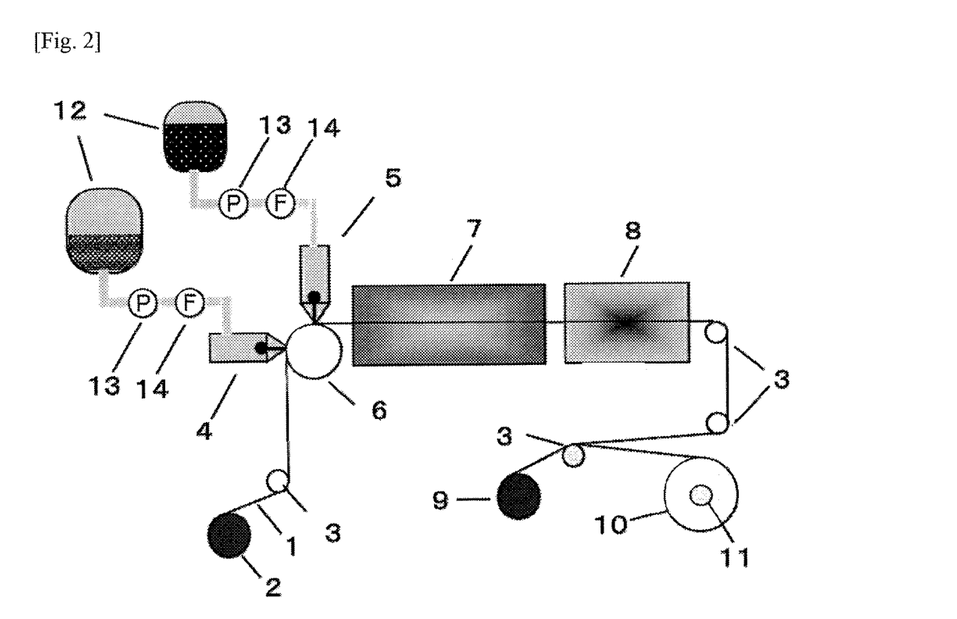
FIG. 2 is a schematic layout drawing showing a preferred embodiment of an apparatus for producing the gas diffusion electrode according to the present invention.

Next, as is schematically shown in FIG. 2, to a transportation apparatus including an unwinder 2, guide rolls 3, a back roll 6, an interleave paper unwinder 11, and a winder 9, two die coaters (4 and 5), a drying furnace 7 and a sintering machine 8 were provided, to prepare a winding-type continuous coater.

As the above prepared hydrophobically treated porous carbon electrode substrate, a web roll of the porous carbon electrode substrate having a thickness of 136 μm and a width of about 400 mm which had been rolled into a 400 m roll was set to the unwinder 2.

The surface of the porous carbon electrode substrate to be coated with the microporous layers is taken as the surface on the side of the layer X, and the web roll was transported by drive rolls provided at the unwinding portion, the winding portion, and the coater portion of the continuous coater. First, a first die coater 4 was used to coat a first ink, and then a second ink was successively coated by a second die coater 5, followed by drying by hot air at 100° C. in the drying furnace 7 to remove water. The electrode substrate was further subjected to sintering in the sintering machine 8 set to a temperature of 350° C., and then wound by the winder 9.

The inks were prepared as follows.

First Ink:

A quantity of 15 parts by mass of the carbon black $CB_1$ having a structure index of 3.0 or more or the carbon black $CB_2$ having a structure index of 3.0 or more, 5 parts by mass of the FEP dispersion ("Neoflon" (registered trademark) ND-110), 15 parts by mass of the surfactant ("TRITON" (registered trademark) X-100), and 65 parts by mass of purified water were kneaded by a planetary mixer to prepare the ink.

Second Ink:

A quantity of 5 parts by mass of the carbon black $CB_3$ having a structure index of less than 3.0, 2 parts by mass of the FEP dispersion ("Neoflon" (registered trademark) ND-110), 7 parts by mass of the surfactant ("TRITON" (registered trademark) X-100), and 86 parts by mass of purified water were kneaded by a planetary mixer to prepare the ink. The kneading conditions in the planetary mixer were adjusted so as to increase the degree of dispersion of the electrically conductive fine particles.

The preparation of the first ink was carried out so that the areal weight of the microporous layer after the sintering was adjusted to 22 g/m². The thickness of the first microporous layer at this time was 31 μm. Further, the preparation of the second ink was carried out so that the thickness of the second microporous layer was adjusted to 6 μm.

The measurement of the short circuit current in the thus prepared gas diffusion electrode was carried out, and the results are shown in Table 1.

Other physical property values are also shown in Table 1.

Example 2

A gas diffusion electrode was obtained in the same manner as in Example 1, except that the carbon black $CB_2$ having a structure index of 3.0 or more was used as the carbon black to be contained in the first microporous layer, in the preparation of the first ink. The 50% filling rate determined in the same manner as in Example 1 was found to be 1.96%. The physical properties are shown in Table 1.

Example 3

A gas diffusion electrode was obtained in the same manner as in Example 1, except that calendering was not carried out in the production process of the porous carbon electrode substrate. The 50% filling rate determined in the same manner as in Example 1 was found to be 1.87%. The physical properties are shown in Table 1.

Example 4

A gas diffusion electrode was obtained in the same manner as in Example 3, except that the carbon black $CB_2$ having a structure index of 3.0 or more was used as the carbon black to be contained in the first microporous layer, in the preparation of the first ink. The 50% filling rate determined in the same manner as in Example 1 was found to be 1.87%. The physical properties are shown in Table 1.

Example 5

In the production process of the porous carbon electrode substrate, the areal weight of the carbon short fibers was adjusted to 28 g/m$^2$, and the deposited amount of the phenol resin on the precursor fiber sheet was 87 parts by mass with respect to 100 parts by mass of the carbon short fibers. A gas diffusion electrode was obtained in the same manner as, in Example 1, except that the carbon short fiber density of the precursor fiber sheet after being subjected to the pressure treatment in the compression step was adjusted to 0.190 g/cm$^3$ and that calendering was not carried out. The 50% filling rate determined in the same manner as in Example 1 was found to be 1.89%. The physical properties are shown in Table 1.

Example 6

A gas diffusion electrode was obtained in the same manner as in Example 5, except that the carbon black $CB_2$ having a structure index of 3.0 or more was used as the carbon black to be contained in the first microporous layer, in the preparation of the first ink. The 50% filling rate determined in the same manner as in Example 1 was found to be 1.89%. The physical properties are shown in Table 1.

Example 7

The preparation of the first ink was carried out so that the areal weight of the microporous layer after the sintering was adjusted to 20 g/m$^2$. The thickness of the first microporous layer at this time was 25 μm. Further, the preparation of the second ink was carried out so that the thickness of the second microporous layer was adjusted to 3 μm. A gas diffusion electrode was obtained in the same manner as in Example 1, except for the above described changes. The 50% filling rate determined in the same manner as in Example 1 was found to be 1.96%. The physical properties are shown in Table 1.

Example 8

A gas diffusion electrode was obtained in the same manner as in Example 7, except that the carbon black $CB_2$ having a structure index of 3.0 or more was used as the carbon black to be contained in the first microporous layer, in the preparation of the first ink. The 50% filling rate determined in the same manner as in Example 1 was found to be 1.96%. The physical properties are shown in Table 1.

Comparative Example 1

The coating of the first ink was carried out so that the areal weight of the microporous layer after the sintering was adjusted to 19 g/m$^2$. The thickness of the first microporous layer at this time was 22 μm. Further, the preparation of the second ink was carried out so that the thickness of the second microporous layer was adjusted to 3 μm. A gas diffusion electrode was obtained in the same manner as in Example 1, except for the above described changes. The 50% filling rate determined in the same manner as in Example 1 was found to be 1.96%. The physical properties are shown in Table 1.

Comparative Example 2

In the procedure of Example 1, the carbon black to be contained in the first microporous layer was changed to the carbon black $CB_3$ having a structure index of less than 3.0, and the areal weight of the microporous layer after the sintering was adjusted to 17 g/m$^2$. The thickness of the first microporous layer at this time was 35 μm. A gas diffusion electrode was obtained in the same manner as in Example 1, except that, in addition to the above changes, the second microporous layer was not coated. The 50% filling rate determined in the same manner as in Example 1 was found to be 1.96%. The physical properties are shown in Table 1.

It can be seen from Table 1 that, in each of the Examples, the percentage of cases where the measured short circuit current density of the gas diffusion electrode is 11 mA/cm$^2$ or less, was 90% or more; and accordingly, these gas diffusion electrodes can prevent the short circuit current within the membrane electrode assemblies, and to increase the durability of the resulting fuel cells. On the other hand, in each of the Comparative Examples, the percentage of cases where the measured short circuit current density of the gas diffusion electrode is 11 mA/cm$^2$ or less, was less than 90%; and accordingly, it can be said that it is difficult for these gas diffusion electrodes to prevent the short circuit current within the membrane electrode assemblies, and to increase the durability of the resulting fuel cells.

Further, using the porous carbon electrode substrates of Examples 1 and 2, and Comparative Examples 1 and 2, five membrane electrode assemblies were prepared for each of the Examples and Comparative Examples, and the OCV of each membrane electrode assembly was measured. As a result, in Examples 3 and 4, all of the OCVs measured were 0.95 V or more. On the other hand, in each of Comparative Examples 3 and 4, one of the measured OCVs was below 0.94 V. The reason for the above described difference in the measured values between the Examples and Comparative Examples is considered to be as follows. While it was possible to reduce the mean values of the short circuit currents in the porous carbon electrode substrates of the Examples, the mean values of the short circuit currents in the porous carbon electrode substrates of the Comparative Examples were high. This is thought to suggest that the use of the porous carbon electrode substrates of the Comparative Examples resulted in an increased occurrence of localized thinning of the membranes, even within the membrane electrode assemblies. In such membrane electrode assemblies, a decrease in performance due to the thinning of the membranes and the occurrence of short circuit currents is accelerated, as a result of repeated starting and stopping of power generation. The impact brought about by such a decreased performance will be much more pronounced in a fuel cell stack composed of a number of membrane electrode assemblies connected in series. In contrast, a fuel cell using the porous carbon electrode substrate according to the present invention has an improved durability in power generation.

TABLE 1

| | | Unit | Example 1 | Example 2 | Example 3 | Example 4 | Example 5 |
|---|---|---|---|---|---|---|---|
| Porous Carbon Electrode Substrate | Areal Weight of Short Carbon Fiber | g/m$^2$ | 26 | 26 | 26 | 26 | 28 |
| | Thickness | μm | 136 | 136 | 143 | 143 | 133 |
| | Areal Weight of Electrode Substrate | g/m$^2$ | 39.0 | 39.0 | 39.0 | 39.0 | 39.0 |
| | Bulk Density | g/cm$^3$ | 0.29 | 0.29 | 0.27 | 0.27 | 0.29 |
| | Areal Weight Ratio | | 0.51 | 0.51 | 0.51 | 0.51 | 0.41 |
| | Short Carbon Fiber Density in Precursor Fiber Sheet after Pressure Treatment in Compression Step | g/cm$^3$ | 0.155 | 0.155 | 0.155 | 0.155 | 0.190 |
| | 50% Filling Rate | % | 1.96 | 1.96 | 1.87 | 1.87 | 1.89 |
| | Filling Rate of Layer X | % | 19.5 | 19.5 | 18.5 | 18.5 | 18.2 |
| | Filling Rate of Layer Z | % | 11.5 | 11.5 | 11.3 | 11.3 | 11.1 |
| | Filling Rate of Layer Y | % | 15.6 | 15.6 | 14.6 | 14.6 | 15.5 |
| | Filling fraction rate of Layer X | | 1.25 | 1.25 | 1.27 | 1.27 | 1.17 |
| | Filling fraction rate of Layer Z | | 0.74 | 0.74 | 0.77 | 0.77 | 0.72 |
| | Calender Treatment | | Present | Present | Absent | Absent | Absent |
| | Hydrophobic Polymer | | FEP | FEP | FEP | FEP | FEP |
| First Microporous Layer | Areal Weight | g/m$^2$ | 22 | 22 | 22 | 22 | 22 |
| | Structure Index of Carbon Black | | 3.4 | 3.1 | 3.4 | 3.1 | 3.4 |
| | Type of Hydrophobic Polymer | | FEP | FEP | FEP | FEP | FEP |
| Second Microporous Layer | Structure Index of Carbon Black | | 2.6 | 2.6 | 2.6 | 2.6 | 2.6 |
| | Type of Hydrophobic Polymer | | FEP | FEP | FEP | FEP | FEP |
| Gas Diffusion Electrode | Total Thickness of Microporous Layer (under Pressure at 0.15 MPa) | μm | 37 | 37 | 37 | 37 | 37 |
| | Total Thickness of Microporous Layer (under Pressure at 2 MPa) | μm | 29 | 29 | 29 | 29 | 29 |
| | Average Short-circuit Current Density | mA/cm$^2$ | 3 | 3 | 6 | 6 | 4 |
| | Percentage of Short-circuit Current Density of 11 mA/cm$^2$ or less | % | 100 | 100 | 90 | 90 | 100 |

TABLE 2

| | | Unit | Example 6 | Example 7 | Example 8 | Comparative Example 1 | Comparative Example 2 |
|---|---|---|---|---|---|---|---|
| Porous Carbon Electrode Substrate | Areal Weight of Short Carbon Fiber | g/m$^2$ | 28 | 26 | 26 | 26 | 26 |
| | Thickness | μm | 133 | 136 | 136 | 136 | 136 |
| | Areal Weight of Electrode Substrate | g/m$^2$ | 39.0 | 39.0 | 39.0 | 39.0 | 39.0 |
| | Bulk Density | g/cm$^3$ | 0.29 | 0.29 | 0.29 | 0.29 | 0.29 |
| | Areal Weight Ratio | | 0.41 | 0.51 | 0.51 | 0.51 | 0.51 |
| | Short Carbon Fiber Density in Precursor Fiber Sheet after Pressure Treatment in Compression Step | g/cm$^3$ | 0.190 | 0.155 | 0.155 | 0.155 | 0.155 |
| | 50% Filling Rate | % | 1.96 | 1.96 | 1.87 | 1.87 | 1.89 |
| | Filling Rate of Layer X | % | 18.2 | 19.5 | 19.5 | 19.5 | 19.5 |
| | Filling Rate of Layer Z | % | 11.1 | 11.5 | 11.5 | 11.5 | 11.5 |
| | Filling Rate of Layer Y | % | 15.5 | 15.6 | 15.6 | 15.6 | 15.6 |
| | Filling fraction rate of Layer X | | 1.17 | 1.25 | 1.25 | 1.25 | 1.25 |
| | Filling fraction rate of Layer Z | | 0.72 | 0.74 | 0.74 | 0.74 | 0.74 |
| | Calender Treatment | | Absent | Present | Present | Present | Present |
| | Hydrophobic Polymer | | FEP | FEP | FEP | FEP | FEP |
| First Microporous Layer | Areal Weight | g/m$^2$ | 22 | 20 | 20 | 19 | 17 |
| | Structure Index of Carbon Black | | 3.1 | 3.4 | 3.1 | 3.4 | 2.6 |
| | Type of Hydrophobic Polymer | | FEP | FEP | FEP | FEP | FEP |
| Second Microporous Layer | Structure Index of Carbon Black | | 2.6 | 2.6 | 2.6 | 2.6 | — |
| | Type of Hydrophobic Polymer | | FEP | FEP | FEP | FEP | — |
| Gas Diffusion Electrode | Total Thickness of Microporous Layer | μm | 37 | 28 | 28 | 25 | 35 |
| | Total Thickness of Microporous Layer | μm | 29 | 25 | 25 | 22 | 17 |
| | Average Short-circuit Current Density | mA/cm$^2$ | 4 | 7 | 7 | 20 | 55 |
| | Percentage of Short-circuit Current Density of 11 mA/cm$^2$ or less | % | 100 | 90 | 90 | 40 | 10 |

In Tables 1 and 2, "Filling rate ratio of layer X" refers to a value obtained by dividing the layer filling rate of the layer X by the layer filling rate of the layer Y, and the "Filling rate ratio of layer Z" refers to a value obtained by dividing the layer filling rate of the layer Z by the layer filling rate of the layer Y.

The gas diffusion electrode according to the present invention is a gas diffusion electrode which is less susceptible to the occurrence of a short circuit current when used in a fuel cell; in which insufficiently bonded carbon short fibers and a resin carbide are sufficiently removed from the substrate surface; and which includes a microporous layer(s) having a sufficient thickness under compression, and thus can be effectively used as a gas diffusion electrode.

DESCRIPTION OF SYMBOLS 1 porous carbon electrode substrate
2 unwinder
3 guide roll (non-driven)
4 first die coater
5 second die coater
6 back roll 7 drying furnace
8 sintering machine
9 winder (driven)
10 interleave paper
11 unwinder (for interleave paper)
12 ink tank
13 liquid feeding pump
14 filter
201 first microporous layer
202 second microporous layer
203 infiltration of microporous layer into porous carbon electrode substrate

The invention claimed is:

1. A gas diffusion electrode having a microporous layer on at least one surface of a porous carbon electrode substrate,
   wherein the porous carbon electrode substrate is composed of carbon short fibers bonded with a resin carbide;
   wherein the porous carbon electrode substrate has a bulk density of from 0.20 to 0.40 g/cm$^3$;
   wherein the porous carbon electrode substrate has an areal weight ratio defined below of from 0.3 to 0.65;
   wherein, when the region of the porous carbon electrode substrate, extending from a plane that has a 50% filling rate defined below and is closest to one surface of the substrate to a plane that has the 50% filling rate and is closest to the other surface thereof, is trisected in the through-plane direction to obtain three layers, a layer located closer to one surface has a layer filling rate defined below different from the layer filling rate of the layer located closer to the other surface;
   wherein the microporous layer has a thickness under an added pressure of 0.15 MPa of from 28 to 45 µm, and has a thickness under an added pressure of 2 MPa of from 25 to 35 µm;
   wherein the areal weight ratio is defined as a value obtained by the equation: areal weight ratio=(A−B)/B:
   wherein A represents the areal weight (g/m$^2$) of the porous carbon electrode substrate, and B represents the areal weight (g/m$^2$) of the carbon short fibers in the porous carbon electrode substrate;
   wherein the 50% filling rate is defined as a value obtained by measuring the filling rate of a plane at every certain length in the direction from one surface toward the other surface of the porous carbon electrode substrate, then calculating the mean value of the measured filling rates of planes, and further obtaining a value corresponding to 50% of the calculated mean value as the 50% filling rate; and
   wherein the layer filling rate of a layer is defined as the mean value obtained from the filling rates of planes constituting the layer.

2. The gas diffusion electrode according to claim 1, wherein the gas diffusion electrode has a short circuit current density in the thickness direction, as measured in a state where a polymer electrolyte membrane having a thickness of 25 µm is laminated on the microporous layer and while applying a voltage of 2 V and an added pressure of 5 MPa thereto, of 11 mA/cm$^2$ or less at 90% or more of measurement points.

3. The gas diffusion electrode according to claim 1, wherein, of the three layers obtained by the trisection, when the layer located closer to one surface of the porous carbon electrode substrate and having the highest layer filling rate is defined as a layer X, the layer located closer to the other surface and having a layer filling rate lower than that of the layer X is defined as a layer Y, and the layer located between the layer X and the layer Y is defined as a layer Z, the layer filling rates of these layers decrease in the order of the layer X, the layer Y, and the layer Z.

4. The gas diffusion electrode according to claim 1, wherein the microporous layer comprises at least a first microporous layer which is in contact with the porous carbon electrode substrate, and a second microporous layer,
   wherein the first microporous layer contains a carbon black having a structure index of 3.0 or more; and
   wherein the second microporous layer contains a carbon black having a structure index of less than 3.0.

5. A method of producing the gas diffusion electrode according to claim 1, the method comprising, in the order mentioned:
   a compression step of subjecting a precursor fiber sheet to a pressure treatment;
   a carbonization step of subjecting the pressure treated precursor fiber sheet to a heat treatment to convert a resin into the resin carbide, to obtain the porous carbon electrode substrate; and
   a microporous layer forming step of forming a microporous layer on one surface of the porous carbon electrode substrate;
   wherein the precursor fiber sheet after being subjected to the pressure treatment in the compression step has a carbon short fiber density of from 0.14 to 0.2 g/cm$^3$.

* * * * *